(12) United States Patent
Katoh et al.

(10) Patent No.: US 7,088,902 B2
(45) Date of Patent: Aug. 8, 2006

(54) PHOTONIC CRYSTAL AND PRODUCING METHOD THEREOF

(75) Inventors: Yoshimichi Katoh, Tenri (JP); Toshiyuki Okumura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 97 days.

(21) Appl. No.: 10/853,249

(22) Filed: May 26, 2004

(65) Prior Publication Data

US 2004/0240834 A1    Dec. 2, 2004

(30) Foreign Application Priority Data

May 28, 2003    (JP)    ............... 2003-151137

(51) Int. Cl.
G02B 6/02 (2006.01)
G02B 6/28 (2006.01)
G02B 6/32 (2006.01)
G02B 6/36 (2006.01)
G02B 6/10 (2006.01)
G02B 6/00 (2006.01)
H01L 21/00 (2006.01)

(52) U.S. Cl. ............... 385/147; 385/123; 385/124; 385/125; 385/126; 385/127; 385/128; 385/129; 385/130; 385/131; 385/132; 385/141; 385/142; 385/143; 385/144; 385/145; 438/29; 438/30; 438/31

(58) Field of Classification Search ............... 385/147, 385/123–132, 141–145; 438/29–31
See application file for complete search history.

(56) References Cited

U.S. PATENT DOCUMENTS 6,640,034 B1 * 10/2003 Charlton et al. ............ 385/122

FOREIGN PATENT DOCUMENTS

| JP | 2000-150340 A | 5/2000 |
| JP | 2000-162459 A | 6/2000 |

* cited by examiner

*Primary Examiner*—Brian Healy
*Assistant Examiner*—Jerry Martin Blevins
(74) *Attorney, Agent, or Firm*—Birch, Stewart, Kolasch & Birch, LLP (57) ABSTRACT

A photonic crystal and a producing method thereof are provided. The photonic crystal includes at least two media of different refractive indices formed on a semiconductor substrate. One of the media is periodically arranged in another one of the media. The photonic crystal has a cleaved surface on its side. The directions of primitive translation vectors representing the periodic arrangement directions of the one medium are at desired angles with the cleaved surface. Preferably, the direction of at least one of the primitive translation vectors is in parallel with the cleaved surface.

15 Claims, 7 Drawing Sheets

FIG.7

PHOTONIC CRYSTAL AND PRODUCING METHOD THEREOF

This nonprovisional application is based on Japanese Patent Application No. 2003-151137 filed with the Japan Patent Office on May 28, 2003, the entire contents of which are hereby incorporated by reference.

BACKGROUND OF THE INVENTION

1. Field of the Invention

The present invention relates to a photonic crystal and a producing method thereof, and more particularly to a photonic crystal capable of efficiently introducing external light and producible with a high yield, and a producing method thereof. The term "light" herein is a concept including, not only visible light, but also electromagnetic waves of longer or shorter wavelengths than the visible light.

2. Description of the Background Art

In recent years, a photonic crystal of a multi-layered structure formed of at least two kinds of dielectric, semiconductor or other materials, having a periodic structure with the refractive index distributed periodically, has attracted an attention. In the photonic crystal, if the refractive indices of the materials and the periodic structure are set appropriately, a frequency band forbidding light propagation appears, which is called a photonic bandgap. The photonic bandgap can suppress propagation of the light having a particular frequency within the photonic crystal. Further, introduction of a defect in the periodic structure of the photonic crystal creates a certain frequency band permitting light propagation within the photonic bandgap, so that the light within the photonic crystal can be deflected or diverged freely. Taking advantage of these characteristics, the photonic crystal can be adapted to an optical resonator or an optical waveguide. In the future, a micro-optical circuit or an optical demultiplexer may be implemented with the photonic crystal.

Methods applicable in production of such a photonic crystal are disclosed, e.g., in Japanese Patent Laying-Open Nos. 2000-150340 and 2000-162459.

The method disclosed in Japanese Patent Laying-Open No. 2000-150340 relates to an exposure method wherein an optical aligner is used for photolithography to expose a lattice pattern on a photoresist. In this method, at least two kinds of patterns are multi-exposed for patterning. With this method, contrast in light intensity between the exposed portion and the non-exposed portion can be increased, which ensures formation of a fine lattice pattern.

In the method disclosed in Japanese Patent Laying-Open No. 2000-162459, firstly, a semiconductor layer is formed on a single crystal substrate. Thereafter, an atomic force microscope fine working method or the like is used to periodically oxidize the surface of the semiconductor layer to thereby form a fine oxide mask. A prescribed thin film material layer is formed on the semiconductor layer in the portion where the oxide mask is not formed, while it is not formed in the portion where the oxide mask is formed. With this method, a high-quality photonic crystal free from sub-micron order damages can be produced.

The conventional photonic crystals produced by the above-described methods and others, however, would pose a problem that external light is not introduced therein efficiently. An optical circuit component made of the photonic crystal that cannot guarantee efficient introduction of external light may become defective. As such, there has been a demand for production of a photonic crystal capable of efficiently introducing external light with a high yield, so as to improve the manufacturing yield of the optical circuit components made of the photonic crystals.

SUMMARY OF THE INVENTION

An object of the present invention is to provide a photonic crystal capable of efficiently introducing external light and producible with a high yield, and a producing method thereof.

According to an aspect of the present invention, a photonic crystal includes at least two media of different refractive indices formed on a semiconductor substrate, and a first medium of the media is periodically arranged in a second medium of the media. The photonic crystal has a cleaved surface on its side, and directions of primitive translation vectors representing the periodic arrangement directions of the first medium are at prescribed angles with the cleaved surface.

In the photonic crystal of the present invention, the direction of at least one of the primitive translation vectors or a direction of at least one of composite vectors of the primitive translation vectors may be in parallel with the cleaved surface.

In the photonic crystal of the present invention, the first medium may be arranged periodically in the a second medium after the second medium is formed on the semiconductor substrate.

Further, in the photonic crystal of the present invention, the first medium may be arranged periodically in the a second medium by forming an oxide mask on the semiconductor substrate, forming a periodic arrangement pattern in the oxide mask, and forming a semiconductor layer, not in a portion with the oxide mask formed, but in a portion with no oxide mask formed.

In the photonic crystal of the present invention, the semiconductor substrate may be made of any of gallium arsenide, silicon and indium phosphide.

In the photonic crystal of the present invention, the periodic arrangement of the first medium may form a triangular lattice pattern, in which case the direction of at least one of the primitive translation vectors turned to the right or left by 30 degrees may be in parallel with the cleaved surface.

Further, in the photonic crystal of the present invention, the periodic arrangement of the first medium may form a square lattice pattern, in which case the direction of at least one of the primitive translation vectors turned to the right or left by 45 degrees may be in parallel with the cleaved surface.

According to another aspect of the present invention, a producing method of a photonic crystal includes the step of forming at least one cleaved surface in a stack including a semiconductor substrate, and the step of forming at least two media on the semiconductor substrate in such a manner that directions of primitive translation vectors representing periodic arrangement directions of one of the media in another one of the media are at prescribed angles with the cleaved surface of the stack.

In the producing method of a photonic crystal of the present invention, the direction of at least one of the primitive translation vectors or a direction of at least one of composite vectors of the primitive translation vectors may be in parallel with the cleaved surface.

In the producing method of a photonic crystal of the present invention, the first medium may be arranged periodically in the second medium after the second medium is formed on the semiconductor substrate.

Further, in the producing method of a photonic crystal of the present invention, the first medium may be arranged periodically in the second medium by forming an oxide mask on the semiconductor substrate, forming a periodic arrangement pattern in the oxide mask, and forming a semiconductor layer, not in a portion with the oxide mask formed, but in a portion with no oxide mask formed.

In the producing method of a photonic crystal of the present invention, the semiconductor substrate may be made of any of gallium arsenide, silicon and indium phosphide.

In the producing method of a photonic crystal of the present invention, the periodic arrangement of the one medium may form a triangular lattice pattern, in which case the direction of at least one of the primitive translation vectors turned to the right or left by 30 degrees may be in parallel with the cleaved surface.

Further, in the producing method of a photonic crystal of the present invention, the periodic arrangement of the first medium may form a square lattice pattern, in which case the direction of at least one of the primitive translation vectors turned to the right or left by 45 degrees may be in parallel with the cleaved surface.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described. In the drawings, the same reference characters denote the same or corresponding portions.

First Embodiment

Figure 1A:
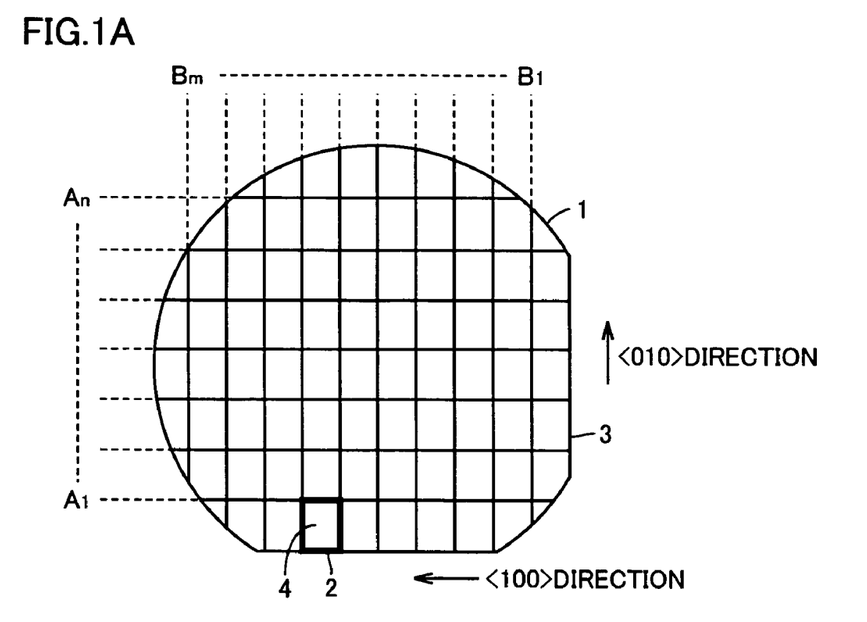
FIG. 1A is a schematic top plan view of a preferable example of a wafer including photonic crystals according to a first embodiment of the present invention.
Figure 1B:
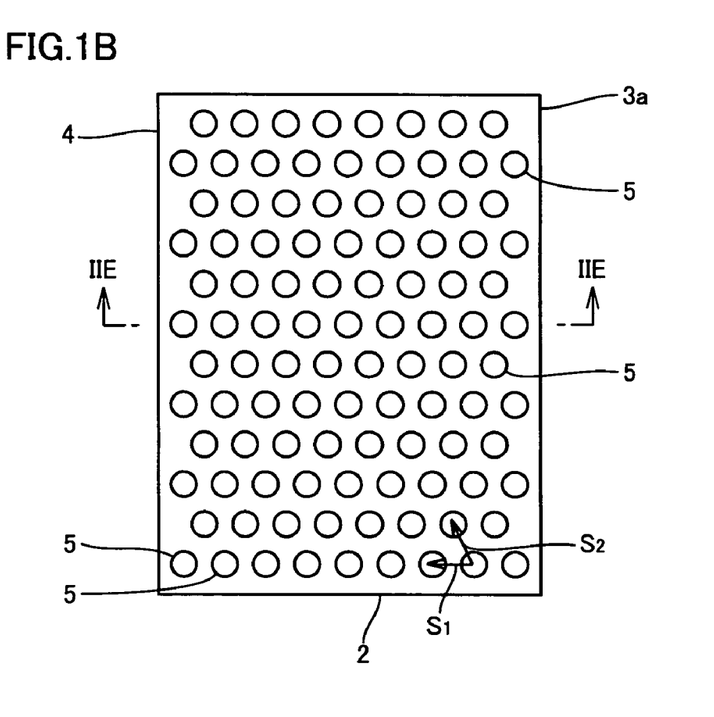
FIG. 1B is a schematic top plan view of the photonic crystal according to the first embodiment of the present invention.

A preferable example of a wafer including photonic crystals according to a first embodiment of the present invention is shown in FIG. 1A in schematic top plan view. A preferable example of the photonic crystal of the first embodiment of the present invention is shown in FIG. 1B in schematic top plan view.

As shown in FIG. 1A, the wafer 1 including a plurality of photonic crystals 4 has cleaved surfaces 2 and 3 on its sides. Individual photonic crystals 4 obtained by cleaving wafer 1 each have a plurality of cylindrical holes 5 periodically arranged in the semiconductor, as shown in FIG. 1B. Holes 5 include the air therein. Photonic crystal 4 has cleaved surfaces 2 and 3a. Primitive translation vectors $S_1$ and $S_2$ may be adopted as the primitive translation vectors representing the periodic arrangement directions of the air within the semiconductor. Here, the direction of primitive translation vector $S_1$ and cleaved surface 2 are made parallel to each other, because of the following reasons.

Through investigation of the cause of degradation in yield of optical circuit components made of photonic crystals, the inventors have found that it is largely attributable to an angle between the end face of the photonic crystal and the direction of the primitive translation vector representing the periodic arrangement direction of one medium (e.g., air) in another medium (e.g., semiconductor) constituting the periodic structure of refractive index distribution of the photonic crystal.

Figure 7:
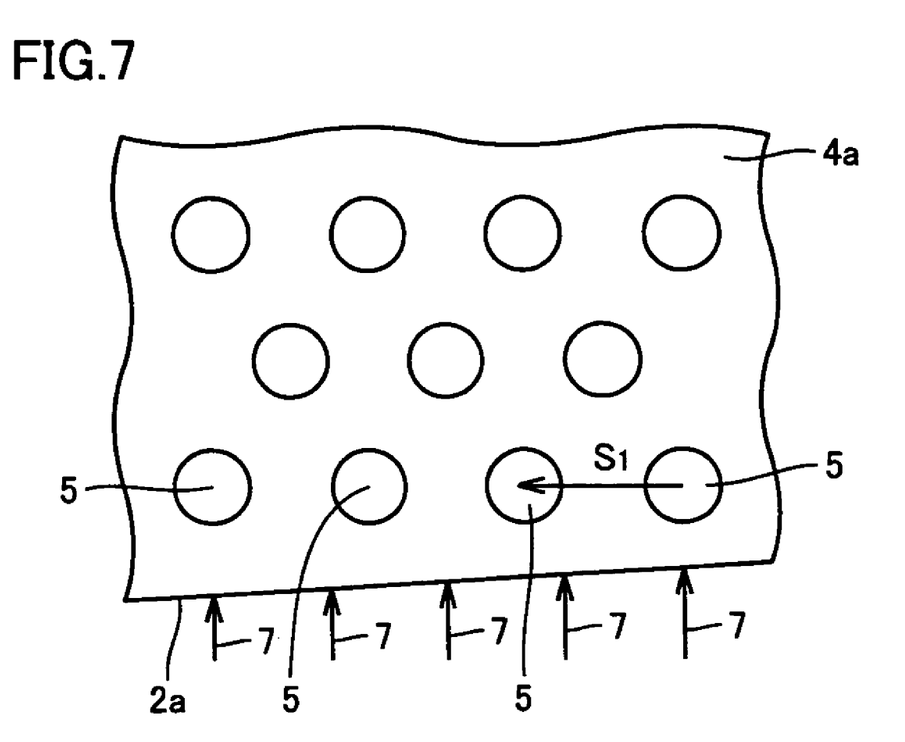
FIG. 7 is a schematic enlarged top plan view of a photonic crystal having an end face that is not in parallel with the direction of primitive translation vector.

More specifically, as shown in a schematic enlarged top plan view of FIG. 7, in the case where the end face 2a of photonic crystal 4a and the direction of primitive translation vector $S_1$ of the air within holes 5 formed in the semiconductor are not in parallel with each other, external light 7 incident perpendicular to end face 2a may not enter into photonic crystal 4a successfully. This hinders efficient introduction of external light 7 into photonic crystal 4a, thereby degrading the manufacturing yield of the optical circuit components made of photonic crystals 4a.

Based on the foregoing, as shown in FIGS. 1A and 1B, wafer 1 including photonic crystals 4 is cleaved in advance to form cleaved surface 2, and a plurality of holes 5 are formed, based on cleaved surface 2, such that the direction of at least one primitive translation vector $S_1$ is in parallel with cleaved surface 2.

Wafer 1 having a surface of (001) plane is then cleaved, at regular intervals, n times in the <010> direction from $A_1$ to $A_n$ (n is an integer of at least 2) and m times in the <100> direction from $B_1$ to $B_m$ (m is an integer of at least 2), to obtain a plurality of photonic crystals. In doing so, in all the photonic crystals 4 included in wafer 1, at least one of the primitive translation vectors, representing the periodic arrangement directions of the air within holes 5, becomes parallel to cleaved surface 2. Further, since cleaved surfaces 2 and 3 are inherently parallel to the cleaved directions of wafer 1, it is unnecessary to reset the cleavage directions of wafer 1. Thus, according to the present invention, it is possible to produce photonic crystals capable of efficiently introducing external light with a high yield.

Figure 2A:
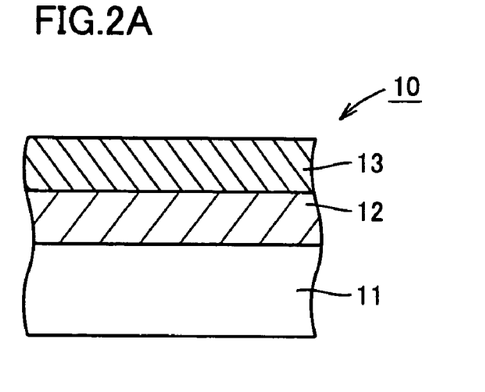
FIGS. 2A–2D are schematic enlarged cross sectional views of a stack used in the present invention, FIG. 2A showing a clad layer and a core layer successively grown on a semiconductor substrate, FIG. 2B showing the stack having a photoresist applied thereon, FIG. 2C showing the stack having a plurality of openings formed in the photoresist, and FIG. 2D showing the stack after etching, and FIG. 2E schematically shows part of a cross section of the photonic crystal shown in FIG. 1B taken along the line IIE—IIE of FIG. 1B.
Figure 2B:
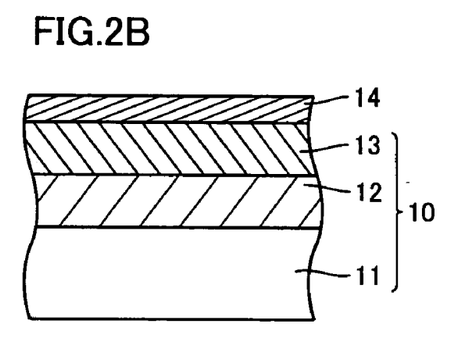
Figure 2C:
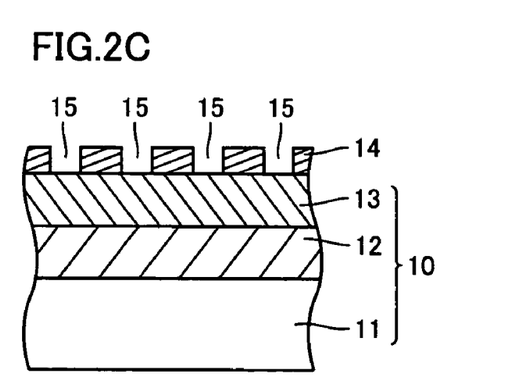
Figure 2D:
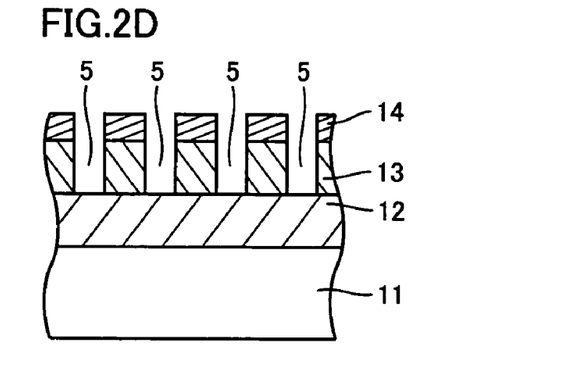
Figure 2E:
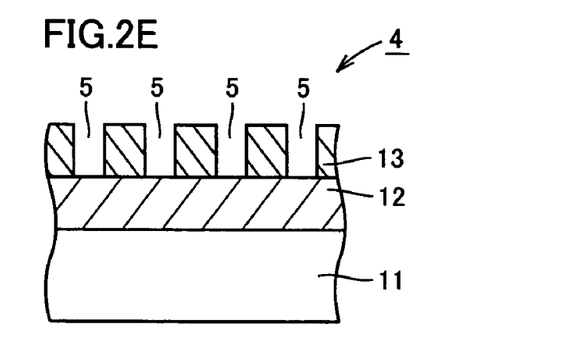

FIG. 2E schematically shows part of a cross section of photonic crystal 4 shown in FIG. 1B, taken along the line IIE—IIE. Photonic crystal 4 includes a semiconductor substrate 11 of GaAs, a clad layer 12 made of a semiconductor represented by a formula of $Al_xGa_{1-x}As$ (0<x<1) and formed on semiconductor substrate 11, a core layer 13 of GaAs formed on clad layer 12, and a plurality of holes 5 periodically arranged in core layer 13.

Hereinafter, a preferable example of the producing method of photonic crystal 4 is explained. Firstly, as shown in FIG. 2A, semiconductor substrate 11 is prepared. Molecular beam epitaxy (MBE), metalorganic chemical vapor deposition (MOCVD) or the like is employed to epitaxially grow clad layer 12 and core layer 13 successively on semiconductor substrate 11, to form a stack 10. Stack 10 is cleaved at its end to form a cleaved surface.

Subsequently, a photoresist 14 is applied on core layer 13, as shown in FIG. 2B. A plurality of openings 15 are then formed in photoresist 14, as shown in FIG. 2C, along the directions of primitive translation vectors representing the periodic arrangement directions in such a manner that the direction of at least one of the primitive translation vectors is in parallel with the cleaved surface of stack 10.

Thereafter, core layer 13 is etched vertically using photoresist 14 having the openings as a mask, as shown in FIG. 2D. At this time, a plurality of holes 5 are formed in core layer 13 which are arranged periodically along the directions of the above-described primitive translation vectors. Lastly, after photoresist 14 is removed with a remover or the like, the wafer is cleaved into a plurality of photonic crystals 4. As such, photonic crystal 4 according to the first embodiment of the present invention having the configuration as shown in FIG. 2E is formed.

Figure 3:
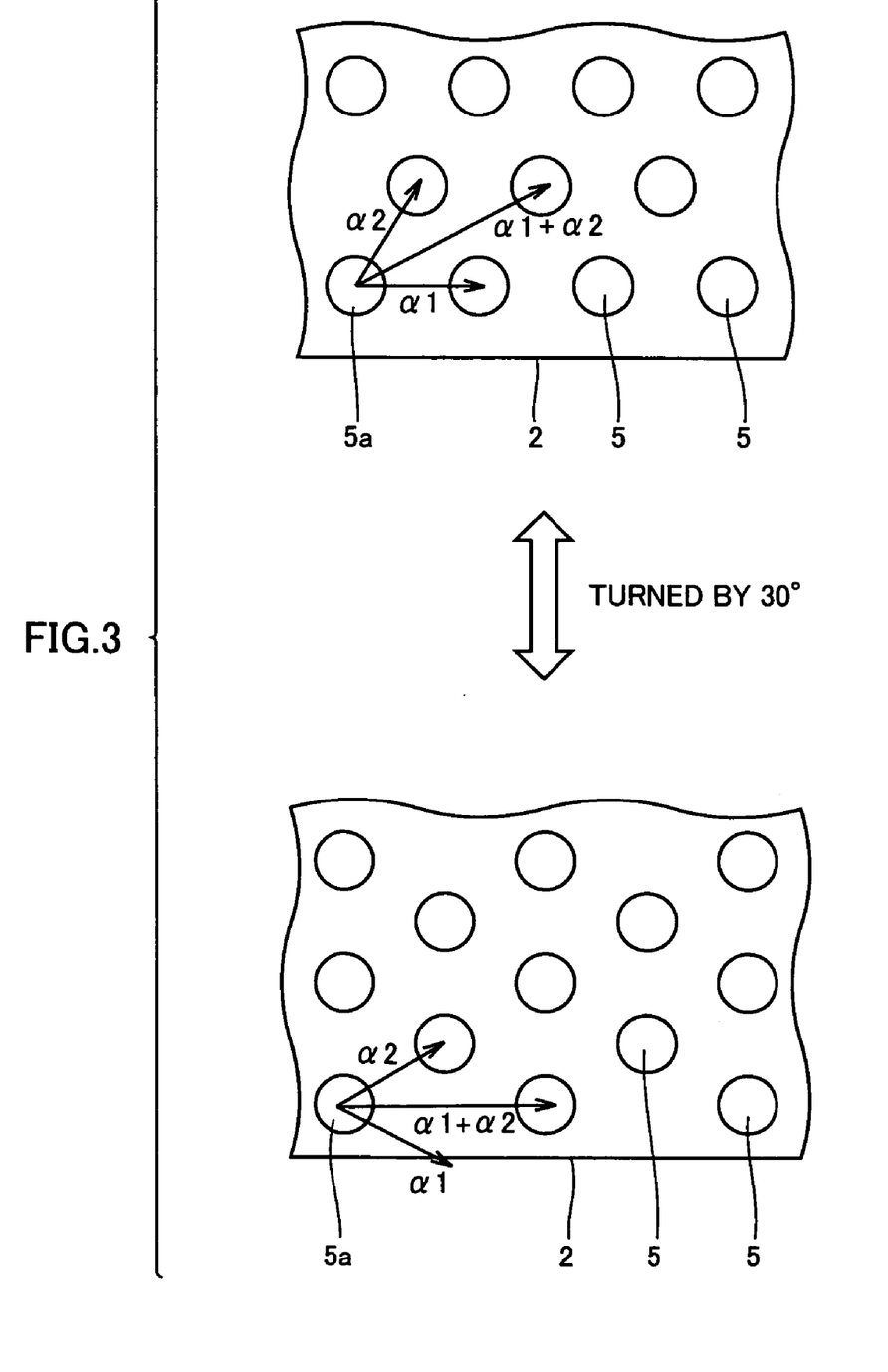
FIG. 3 is a schematic enlarged top plan view of a photonic crystal according to the first embodiment of the present invention.

In this photonic crystal 4, as shown in a schematic enlarged top plan view of FIG. 3, the periodic arrangement pattern of the air within holes 5 formed in the semiconductor layer constitutes a triangular lattice pattern. The directions of the primitive translation vectors may be turned to the right by 30 degrees around hole 5a, to make the direction of a composite vector ($α1+α2$) of primitive translation vectors $α1$ and $α2$ in parallel with cleaved surface 2. When the primitive translation vectors are turned to the right by additional 30 degrees, the direction of primitive translation vector $α2$ becomes parallel to cleaved surface 2.

As such, it is possible to produce, with a high yield, a photonic crystal capable of efficiently introducing external light, even if a waveguide is formed in a direction different from that of primitive translation vector.

Figure 6:
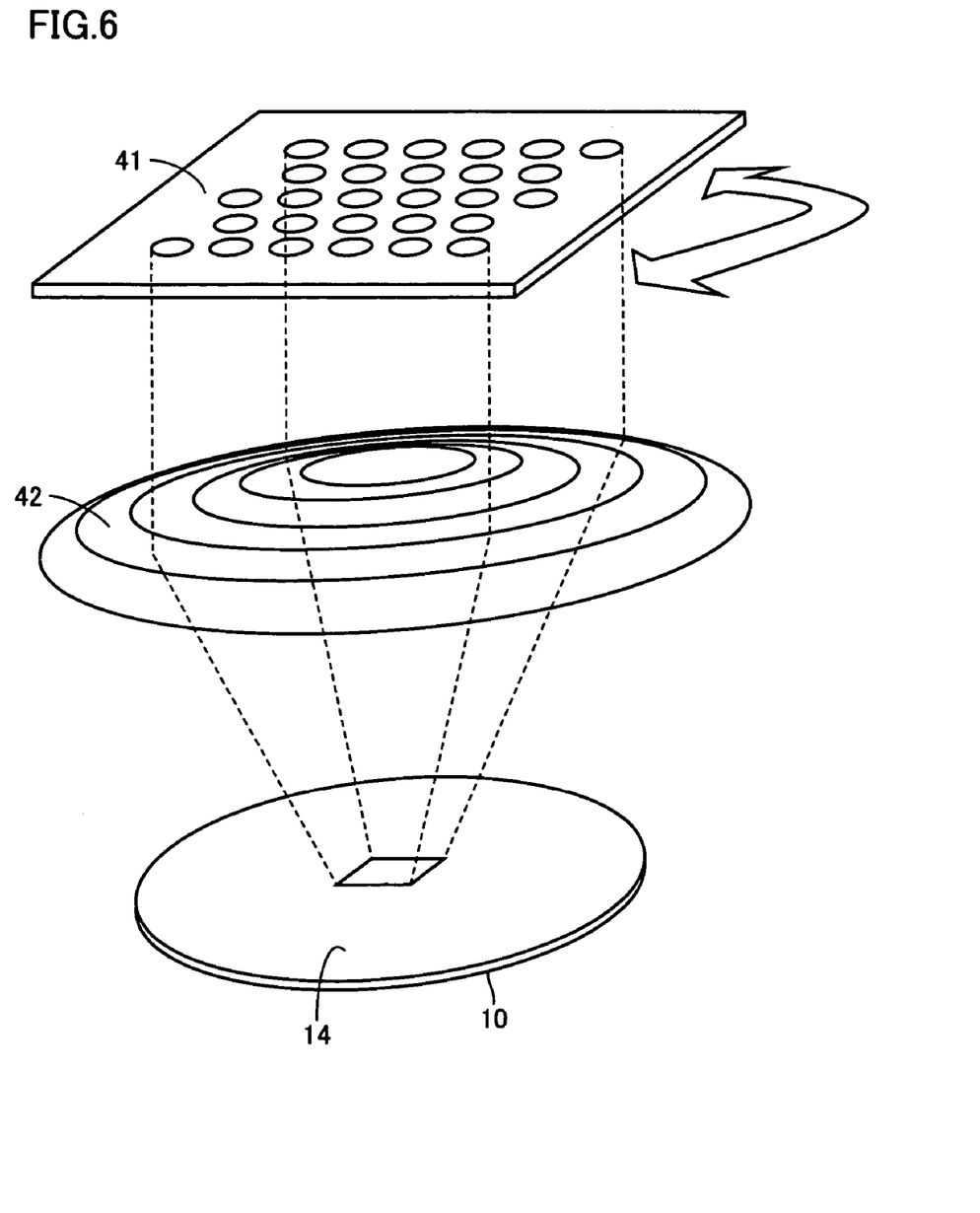
FIG. 6 is a schematic conceptual diagram showing by way of example how primitive translation vectors are turned by a prescribed angle in a photonic crystal of the present invention.

Here, a way of rotating the primitive translation vectors is shown by way of example in a schematic conceptual diagram of FIG. 6. In this method, firstly, an exposure mask 41 is turned to the right or left by a prescribed angle with respect to stack 10 applied with photoresist 14. Next, stack 10 is irradiated with light from above exposure mask 41 via an optical lens 42, so that photoresist 14 on stack 10 is exposed. After removal of the exposed photoresist 14, stack 10 is etched using the remaining photoresist 14 as a mask.

In the present embodiment, cleaved surfaces 2 and 3 orthogonal to each other have been formed. Alternatively, only one of cleaved surfaces 2 and 3 may be formed, in which case a plurality of holes 5 may be formed, on the basis of the cleaved surface, in the directions of the primitive translation vectors as described above. The present embodiment with two cleaved surfaces formed is advantageous in that, while one cleaved surface is used as the reference, the other cleaved surface can be used for confirmation. This makes it possible to periodically arrange a plurality of holes 5 in photonic crystal 4 with higher precision.

In the present embodiment, the substrate of GaAs has been used as semiconductor substrate 11. However, not limited thereto, a substrate of any material capable of cleavage, such as silicon (Si) or indium phosphide (InP), may be used. In the case of using Si, a substrate of SOI (Silicon On Insulator) may be employed, in which case Si may be used as a core layer. This facilitates fine working of the photonic crystal. In the case of using a substrate of InP, a mixed-crystal semiconductor represented as InGaAsP lattice-matched on the substrate may be grown on the substrate. Since a surface level is less likely to form in the mixed-crystal semiconductor of InGaAsP, absorption of the light propagating through the photonic crystal is restricted. Thus, in this case, a photonic crystal suffering less light loss can be formed.

Although the producing method of the photonic crystal having periodically arranged holes 5 has been shown in the present embodiment, semiconductor pillars may be arranged periodically in a triangular lattice pattern if the light-transmitting and light-blocking portions are inverted in exposure mask 41 of FIG. 6. Further, although the air and the semiconductor have been used as one and the other media in the present embodiment, the media are of course not limited thereto. Still further, three or more kinds of media different in refractive index may be employed, in which case at least one of the media may be arranged periodically in the other media.

Second Embodiment

Figure 4:
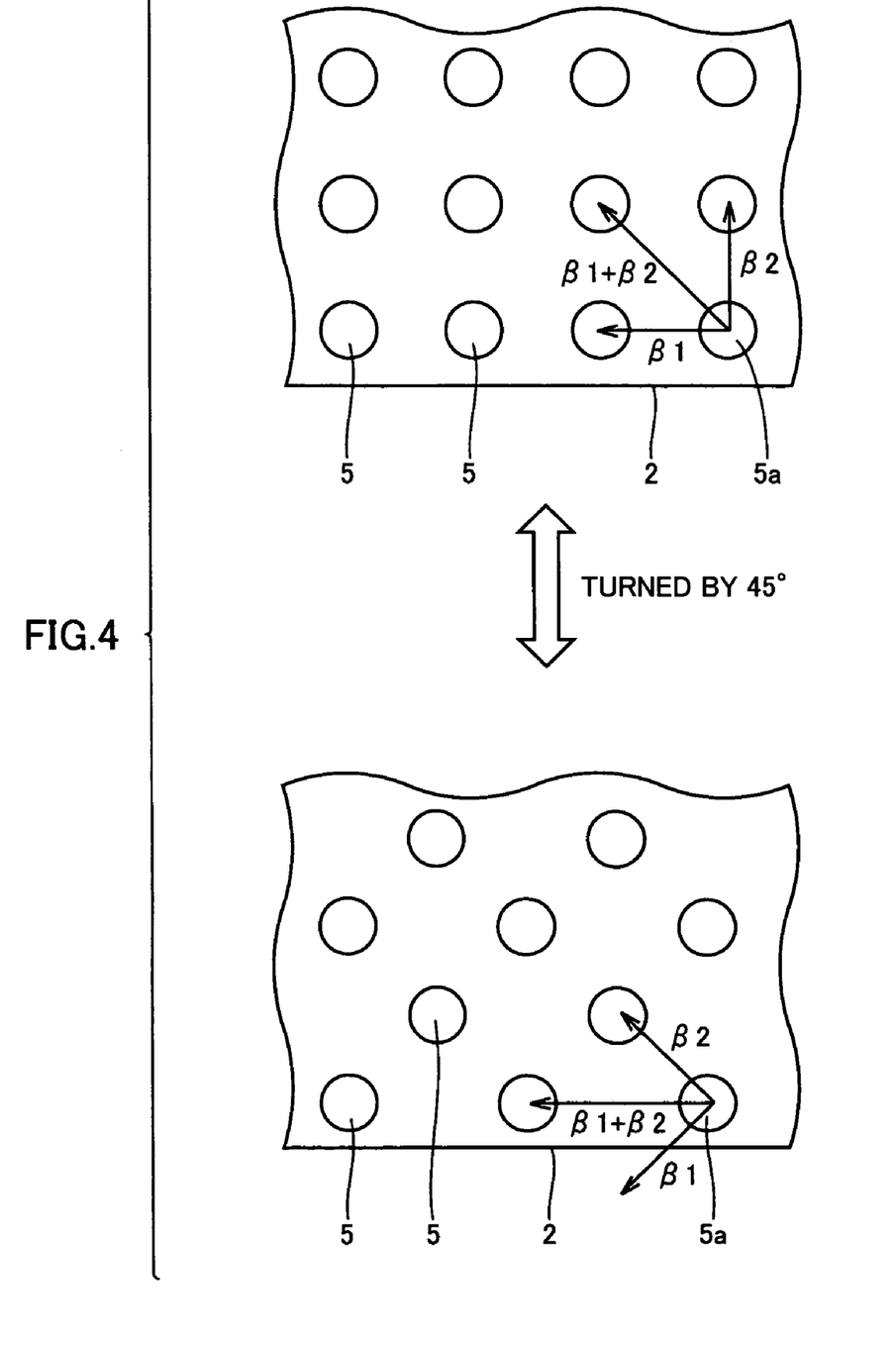
FIG. 4 is a schematic enlarged top plan view of a photonic crystal according to a second embodiment of the present invention.

The photonic crystal according to a second embodiment of the present invention is characterized in that the periodic arrangement pattern of the air within holes 5 forms a square lattice pattern as shown in a schematic enlarged top plan view of FIG. 4, instead of the triangular lattice pattern in the first embodiment.

The primitive translation vectors may be turned to the left by 45 degrees around hole 5a, to make the direction of a composite vector ($β1+β2$) of primitive translation vectors $β1$ and $β2$ in parallel with cleaved surface 2. When the primitive translation vectors are turned to the left additionally by 45 degrees, the direction of primitive translation vector $β2$ becomes parallel to cleaved surface 2. The other configuration of the second embodiment is identical to that of the first embodiment, and thus, description thereof is not repeated here.

Third Embodiment

The photonic crystal according to a third embodiment of the present invention differs in producing method from those of the first and second embodiments. It also differs in that an oxide layer is formed between the air existing within the holes and the semiconductor substrate. A preferable example of the producing method of the photonic crystal according to the third embodiment is now explained.

Figure 5A:
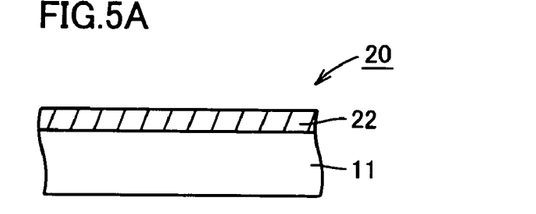
FIGS. 5A–5E are schematic enlarged cross sectional views of a stack used in the present invention, FIG. 5A showing a stack having an oxide layer formed on a semiconductor substrate, FIG. 5B showing the stack of FIG. 5A on which a photoresist is applied, FIG. 5C showing the stack having a plurality of openings formed in the photoresist, FIG. 5D showing the stack after etching, and FIG. 5E showing the stack after removal of the photoresist.

Firstly, as shown in a schematic enlarged cross section of FIG. 5A, a semiconductor substrate 11 of GaAs is prepared, and an oxide layer 22 of $SiO_2$ is formed on semiconductor substrate 11 by electron beam evaporation or the like, to form a stack 20. Stack 20 is cleaved at its end to form a cleaved surface.

Figure 5B:
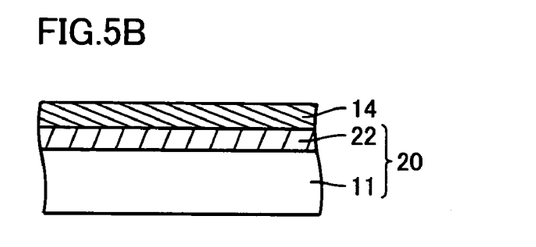
Figure 5C:
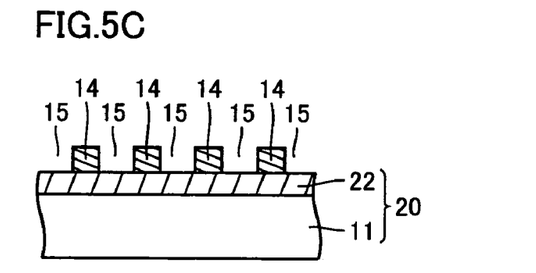

Next, photoresist 14 is applied on oxide layer 22, as shown in FIG. 5B. As shown in FIG. 5C, a plurality of openings 15 are formed in photoresist 14 in such a manner that the primitive translation vectors representing the periodic arrangement directions are at prescribed angles with the cleaved surface and that the direction of at least one of the primitive translation vectors becomes parallel to the cleaved surface. Here, the periodic arrangement pattern of openings 15 is a triangular lattice pattern, as in the first embodiment.

Figure 5D:
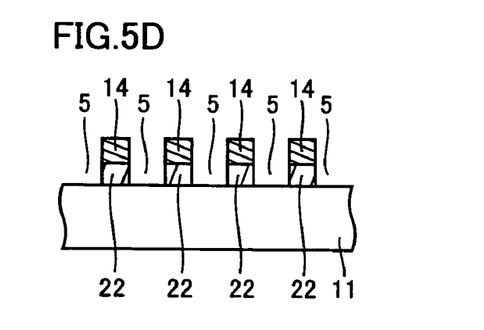
Figure 5E:
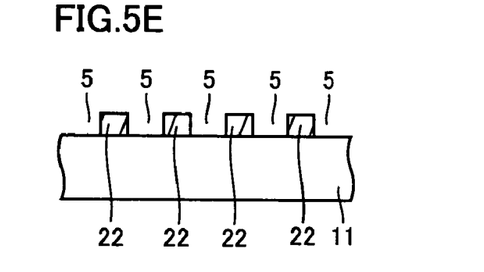

Thereafter, as shown in FIG. 5D, oxide layer 22 is etched vertically using photoresist 14 provided with the openings as a mask, to partially remove oxide layer 22 to thereby expose the surface of semiconductor substrate 11. At this time, a plurality of holes 5 are formed in oxide layer 22, which are periodically arranged in the directions of the above-described primitive translation vectors. Next, photoresist 14 is removed by a remover or the like, as shown in FIG. 5E.

Figure 5F:
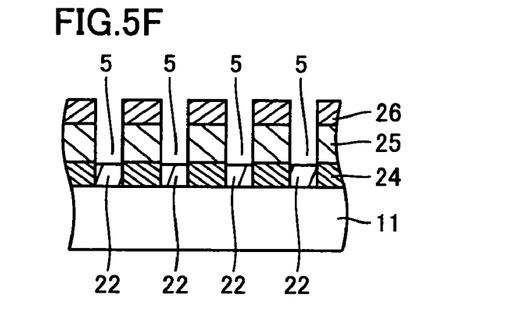
FIG. 5F is a schematic enlarged cross sectional view of a wafer including a plurality of photonic crystals according to a third embodiment of the present invention.

Thereafter, as shown in FIG. 5F, a lower clad layer 24 of $Al_{0.5}Ga_{0.5}As$, a core layer 25 of GaAs, and an upper clad layer 26 of $Al_{0.5}Ga_{0.5}As$ are epitaxially grown successively on the exposed surface of semiconductor substrate 11, by MBE, MOCVD or the like. At this time, oxide layer 22 functions as an oxide mask to prevent the semiconductor layers from growing on oxide layer 22. Thus, the above-described semiconductor layers are not formed in the portion where oxide layer 22 is formed, while they are formed in the portion where oxide layer 22 is not formed.

Lastly, the wafer including the photonic crystals of the third embodiment is cleaved. As such, the photonic crystal of the third embodiment is formed which has holes 5 arranged periodically along the direction of primitive translation vector that is in parallel with the cleaved surface. Based on the present embodiment, semiconductor pillars may be arranged periodically in a triangular lattice pattern by inverting the light-transmitting portions and the light-blocking portions in exposure mask 41 shown in FIG. 6.

In the third embodiment, holes 5 are formed, arranged periodically, by epitaxially growing the semiconductor layers selectively only on semiconductor substrate 11. This suppresses formation of the surface levels of lower clad layer 24, core layer 25 and upper clad layer 26. As such, absorption of the light propagating through the photonic crystal is restricted, so that a photonic crystal suffering less light loss can be formed. The other configuration of the third embodiment is identical to that of the first embodiment, and thus, description thereof is not repeated here.

Fourth Embodiment

The photonic crystal according to a fourth embodiment of the present invention differs from that of the third embodiment in that the air within a plurality of holes in the semiconductor forms a square lattice pattern, instead of the triangular lattice pattern as in the third embodiment.

Further, the direction of a composite vector of the primitive translation vectors may be made parallel to the cleaved surface by turning the primitive translation vectors to the right or left by 45 degrees. The direction of at least one primitive translation vector turned to the same direction by additional 45 degrees becomes parallel to the cleaved surface. The other configuration of the fourth embodiment is identical to that of the third embodiment, and thus, description thereof is not repeated here.

As described above, according to the present invention, a photonic crystal capable of efficiently introducing external light and producible with a high yield, and a producing method thereof, can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A photonic crystal, including at least two media of different refractive indices formed on a semiconductor substrate comprising:
   a first medium of said media being periodically arranged in a second medium of said media, said photonic crystal having a cleaved surface on its side, and directions of primitive translation vectors representing periodic arrangement directions of said first medium being at prescribed angles with said cleaved surface, wherein said cleaved surface is in a crystalline orientation plane of said second media.

2. The photonic crystal according to claim 1, wherein the direction of at least one of said primitive translation vectors or a direction of at least one of composite vectors of said primitive translation vectors is in parallel with said cleaved surface.

3. The photonic crystal according to claim 1, wherein said first medium is arranged periodically in said second medium after said second medium is formed on said semiconductor substrate.

4. The photonic crystal according to claim 1, wherein said first medium includes an oxide layer and is arranged periodically in said second medium that includes a semiconductor layer, not in a portion with said oxide layer formed, but in a portion with no said oxide layer formed.

5. The photonic crystal according to claim 1, wherein said semiconductor substrate is made of any of gallium arsenide, silicon and indium phosphide.

6. The photonic crystal according to claim 1, wherein the periodic arrangement of said first medium forms a triangular lattice pattern, and the direction of at least one of composite vectors of said primitive translation vectors is in parallel with said cleaved surface.

7. The photonic crystal according to claim 1, wherein the periodic arrangement of said first medium forms a square lattice pattern, and the direction of at least one of composite vectors of said primitive translation vectors is in parallel with said cleaved surface.

8. A producing method of at least one photonic crystal, comprising the steps of:
   forming at least one reference cleaved surface in a wafer including a semiconductor substrate; and
   forming at least two media on said semiconductor substrate in such a manner that directions of primitive translation vectors representing periodic arrangement directions of a first medium of said media in a second medium of said media are at prescribed angles with the reference cleaved surface of said wafer.

9. The producing method of a photonic crystal according to claim 8, wherein the direction of at least one of said primitive translation vectors or a direction of at least one of composite vectors of said primitive translation vectors is in parallel with said cleaved surface.

10. The producing method of a photonic crystal according to claim 8, wherein said first medium is arranged periodically in said second medium after said second medium is formed on said semiconductor substrate.

11. The producing method of a photonic crystal according to claim 8, wherein said first medium is arranged periodically in said second medium by forming an oxide mask on said semiconductor substrate, forming a periodic arrangement pattern in said oxide mask, and forming a semiconductor layer, not in a portion with said oxide mask formed, but in a portion with no said oxide mask formed.

12. The producing method of a photonic crystal according to claim 8, wherein said semiconductor substrate is made of any of gallium arsenide, silicon and indium phosphide.

13. The producing method of a photonic crystal according to claim 8, wherein the periodic arrangement of said first medium forms a triangular lattice pattern, and the direction of at least one of composite vectors of said primitive translation vectors is in parallel with said cleaved surface.

14. The producing method of a photonic crystal according to claim 8, wherein the periodic arrangement of said first medium forms a square lattice pattern, and the direction of at least one of composite vectors of said primitive translation vectors is in parallel with said cleaved surface.

15. The producing method of a photonic crystal according to claim 8, further comprising forming said at least one photonic crystal by cleaving said wafer at regular intervals parallel to each said reference cleaved surface of said wafer.

* * * * *